United States Patent

Faccio et al.

[11] Patent Number: 6,001,914
[45] Date of Patent: Dec. 14, 1999

[54] CROSSLINKABLE SILICONE COMPOUND, STABLE UNDER STORAGE CONDITIONS

[75] Inventors: Enrico Faccio, Badia Polesine; Francesco Callegaro, Canaro, both of Italy

[73] Assignee: Zhermack S.p.A., Badia Polesine, Italy

[21] Appl. No.: 08/901,829

[22] Filed: Jul. 28, 1997

[30] Foreign Application Priority Data

Jul. 30, 1996 [IT] Italy .................................. PD96A0194

[51] Int. Cl.$^6$ ...................................................... C08K 5/34
[52] U.S. Cl. ........................ 524/450; 524/425; 524/451; 524/786; 524/789; 524/791; 524/848
[58] Field of Search ...................................... 524/450, 425, 524/791, 786, 451, 789, 474, 491, 848

[56] References Cited

U.S. PATENT DOCUMENTS

| | | | |
|---|---|---|---|
| 4,035,453 | 7/1977 | Hittmair et al. | 264/16 |
| 5,332,538 | 7/1994 | Levinson et al. | 264/25 |
| 5,530,060 | 6/1996 | Fujiki et al. | 524/786 |
| 5,830,951 | 11/1998 | Fiedler | 525/478 |

FOREIGN PATENT DOCUMENTS

| | | |
|---|---|---|
| 0 231 420 | 8/1987 | European Pat. Off. . |
| 0 416 471 | 3/1991 | European Pat. Off. . |
| 0 579 132 | 1/1994 | European Pat. Off. . |

OTHER PUBLICATIONS

Patent Abstract of Japan vol. 096, No. 003, Mar. 29, 1996 & JP 07 300555 A (Kanegafuchi Chem Ind Co Ltd), Nov. 14, 1995, * abstract *.

*Primary Examiner*—Melvyn I. Marquis
*Attorney, Agent, or Firm*—Guido Modiano; Albert Josif; Daniel J. O'Byrne

[57] ABSTRACT

A crosslinkable silicone compound including: a crosslinkable silicone polymer, constituted by polyorganosiloxane; a crosslinking agent, constituted by polyhydrogen organosiloxane; a platinum catalyst; and a synthetic sodium-aluminum zeolite. The compound is completed by inhibitors and/or fillers and/or release agents and/or colors and/or plasticizers and/or additives to modify its rheological characteristics.

16 Claims, No Drawings

CROSSLINKABLE SILICONE COMPOUND, STABLE UNDER STORAGE CONDITIONS

BACKGROUND OF THE INVENTION

The present invention relates to a crosslinkable silicone compound, stable under storage conditions.

The compound is used particularly but not exclusively in dentistry for preparing impression materials.

Conventional silicone rubbers are substantially constituted by silicone polymers and fillers.

They are mainly different according to the kind of polymer being used and to the cross-linking mechanism.

In materials for dental impressions based on addition-crosslinking polyorganosiloxanes, the crosslinking mechanism arises from the addition of silicon-hydrogen groups by means of double bonds in the presence of a catalyst based on platinum salts.

This reaction is known as hydrosilylation and occurs at room temperature when metal/olefin platinum complexes are used.

The setting reaction allows to obtain an elastomeric compound which has excellent characteristics.

Natural or synthetic mineral fillers, pigments, release agents, rheological modifiers et cetera are normally used in silicone rubbers.

For RTV (room temperature vulcanization) silicone rubbers used in dentistry for taking impressions, the product is usually marketed in two separate mixes, called "base" and "catalyst", which must be mixed uniformly before use.

After mixing, therefore, the compound is placed in contact with the surfaces to be duplicated until it sets completely.

Between the beginning of the mixing and complete crosslinking there is a first period, known as "working time", during which the two parts mixed together are plastic and can be worked, and there is a second period during which the mass loses its plasticity and setting begins.

The time during which the reaction occurs is known as "setting time"; at the end of this period, the product has become an irreversible elastomer.

To allow optimum clinical application, the total cycle up to setting must last a few minutes, usually between a minimum of one minute to a maximum of ten minutes from when mixing begins.

For users it is furthermore essential to have control over the reaction and to have a reaction in which performance always remains the same until the expiration date.

After setting, the product must exhibit some essential requirements for specific application in dentistry, such as dimensional stability, high detail reproduction ability, and as mentioned, constant working time and setting time.

The working time and the setting time can be affected by adding to the compound inhibitors which belong to the group of methyl or vinyl cyclotetrasiloxanes; apart from the possibility to control the reaction, it is very important that these parameters remain unchanged during the period of guarantee determined and specified by the manufacturer.

In order to ensure these conditions, the reactivity of the component which is most sensitive and therefore most unstable, i.e., the platinum catalyst, would have to remain constant; in practice, instead, it tends to lose part of its reactivity over time, degrading due to reasons which have not been properly clarified yet.

This becomes evident through an increase in the setting time, until the product becomes no longer suitable for use or no longer conforms to the specifications of the manufacturer.

This effect increases if the product is stored and especially if it is stored at high temperatures.

SUMMARY OF THE INVENTION

The aim of the present invention is to provide a crosslinkable silicone compound which remains stable under storage conditions, i.e., even at temperatures which are higher than those normally recommended for good preservation.

Within the scope of this aim, a consequent primary object of the invention is to provide a compound which crosslinks by addition.

Another important object of the invention is to provide a compound in which the catalyst is protected against the action of potential contaminants which are almost inevitably present in the components.

A further object of the invention is to provide a compound which can in any case be used differently outside the field of dentistry.

This aim, these objects and others which will become apparent hereinafter are achieved by a crosslinkable silicone compound, characterized in that it comprises:

a crosslinkable silicone polymer;

a crosslinking agent;

a platinum catalyst;

a sodium-aluminum zeolite.

Advantageously, said silicone polymer is a polyorganosiloxane which has at least one or more vinyl groups in the end part of the linear molecule.

Conveniently, said crosslinking agent is a polyhydrogen organosiloxane or siloxane which contains silicon-hydrogen groups.

DETAILED DESCRIPTION OF THE PREFERRED EMBODIMENTS

Further characteristics and advantages of the present invention will become apparent from the following detailed description of a preferred embodiment, given by way of non-limitative example.

In accordance with another aspect of the present invention there are provided two compositions which, when mixed together, resemble the compound of the invention.

Said compositions are advantageously provided in the form of two pastes which have more preferably premixed components.

A first one of said pastes, known as "base", comprises a crosslinkable silicone polymer which is preferably a polyorganosiloxane of the type having at least one or more vinyl groups in the end part of the linear molecule and a crosslinking agent which is preferably a polyhydrogen organosiloxane. Mineral fillers such as quartz and/or calcium carbonate, silica, talc, and colors may be added.

A second paste, known as "catalyst", comprises a polyorganosiloxane preferably of the type having one or more vinyl groups in the end part of the linear molecule, a platinum catalyst and advantageously a stabilizer preferably constituted by sodium-aluminum zeolite. Mineral fillers such as quartz, calcium carbonate, silica, talc and an inhibitor may also be added.

It is possible to provide other ingredients to complete the formula, such as inhibitors, release agents, or additives to modify the rheological characteristics.

The preferred inhibitors are methyl vinyl cyclotetrasiloxanes, whilst paraffin mineral oils are advantageously used as release agents.

As regards rheological modifiers, use of microfine quartz and/or fumed silica is preferred.

Food-compatible colors are used.

The two pastes must be mixed thoroughly before use in a known manner.

As regards the stabilizing agent, as mentioned it is advantageously a synthetic sodium-aluminum zeolite, with an average formula Na12(AlO2)12(SiO2)12.27H20 which has the appearance of a water-insoluble white powder.

The particles are cube-shaped with rounded corners and edges.

The basic elements of the structure of the sodium- aluminum zeolite are shaped like octahedral cubes joined to each other by hexahedrons.

The sodium ions, which compensate the excess negative charge, can move freely within the channels of the zeolite.

In the silicone compound according to the invention, the zeolite has the primary effect of binding the metal ions, which are harmful for the stability of the platinum catalyst.

It has been found experimentally that optimum results are achieved with a ratio of 1:0.01 to 1:0.003 between said zeolite and said platinum.

In a silicone rubber, the sodium ions can be replaced with other cations.

This ion exchange property occurs selectively.

The exact mechanism of protection towards platinum is currently still being studied, but it has been ascertained that the activity of the zeolite preserves the platinum catalyst from the action of any contaminants contained in the compound, prolonging its action.

The presence of contaminants is practically inevitable owing to the nature and origin of the components of the compound in which mineral fillers are present.

In the paste hereinbefore referred to as "catalyst", the contained zeolite preserves the catalyst, so that the product maintains constant working time and setting time longer than normal systems which do not include it.

It is also possible to use zeolite in the paste described as "base", where it acts as a filler.

Further and more detailed information regarding the composition of zeolites is available in publications published by Degussa AG: Technical bulletin pigments no. 71 Wessalith for detergents 4th edition: August 1993—Technical information TI1160 January 1996.

Specific literature on zeolites, also known as molecular sieves, are widely available in many publications issued through the years.

EXAMPLES

By way of an example, a composition of the product can include:

| | (based on 100 parts by weight) |
|---|---|
| "base" paste | |
| vinyl polymer | 94 parts by weight |
| crosslinking agent | 6 parts by weight |
| "catalyst" paste | |
| vinyl polymer | 89.38 parts by weight |
| platinum catalyst | 0.6 parts by weight |
| inhbitor | 0.02 parts by weight |
| zeolite | 10 parts by weight |

Comparative practical tests with crosslinkable silicone compounds without sodium-aluminum zeolite have shown, by determination of the setting time, that the silicone compound with zeolite (particularly in the above composition) withstands prolonged aging at 65° C., whilst the compound without zeolite (particularly the one in which the "catalyst" component has 99.38 parts of polymer, 0.6 parts of catalyst and 0.02 parts of inhibitor and in which the "base" component is unchanged) undergoes a gradual increase in setting time which is a direct consequence of the loss of reactivity of the catalyst.

For the compound with zeolite, the working and setting times remain substantially unchanged, even after exposure to 65° C., for a period of at least 25 days.

Other comparative tests between a silicone-based compound with zeolite (again in the above composition) and a compound containing micronized quartz (to replace the 10 parts of zeolite in the "catalyst" component) have pointed out that the quartz-containing compound starts to increase its setting time after a short aging period, whilst in the zeolite-containing compound the setting time remains practically unchanged.

The action of zeolite occurs even if its amount is varied or if it is combined with quartz.

In accordance to a further object of the present invention, a method for taking impressions of an oral cavity comprising the step of placing in contact a crosslinkable silicone compound comprising:

a crosslinkable silicone polymer;

a crosslinkable agent;

a platinum catalyst;

a sodium-aluminum zeolite, with a surface to be duplicated.

In practice it has been observed that the intended aim and objects of the present invention have been achieved.

The invention thus conceived is susceptible of numerous modifications and variations, all of which are within the scope of the inventive concept.

All the details may furthermore be replaced with other technically equivalent elements.

What is claimed is:

1. A crosslinkable silicone compound, comprising:

a crosslinkable silicone polymer;

a crosslinking agent;

a platinum catalyst;

a hydrated sodium-aluminum zeolite.

2. A silicone compound according to claim 1, wherein said silicone polymer is a polyorganosiloxane which has at least one or more vinyl groups in the end part of the linear molecule.

3. A silicone compound according to claim 1, wherein said crosslinking agent contains silicon-hydrogen groups.

4. A silicone compound according to claim 1, wherein the ratio between said zeolite and said platinum catalyst is between 1:0.01 and 1:0.003.

5. A silicone compound according to claim 1, wherein said zeolite has an average formula Na12(AlO2)12(SiO2) 12.27H2O.

6. A silicone compound according to claim 1, wherein it is provided in the form of two components.

7. A compound according to claim 6, wherein a first one of said two components comprises:

said crosslinkable silicone polymer; and said crosslinking agent;

and a second one of said two components comprises:

a polyorganosiloxane said platinum catalyst said hydrated sodium-aluminum zeolite.

8. A silicone compound according to claim 6, wherein it vulcanizes at room temperature with a setting cycle lasting a minimum of one minute up to a maximum of ten minutes from when mixing of the two components begins.

9. A silicone compound according to claim 1, wherein it further comprises additives selected from the group consisting of inhibitors, fillers, release agents, colors, additives to modify the rheological characteristics and mixture thereof.

10. A compound according to claim 9, wherein said inhibitors are methyl vinyl cyclotetrasiloxanes.

11. A compound according to claim 9, wherein said fillers are selected from the group consisting of quartz, calcium carbonate, silica, talc and mixtures thereof.

12. A compound according to claim 9, wherein said release agents are paraffin mineral oils.

13. A compound according to claim 9, wherein said rheological modifiers are selected from the group consisting of microfine quartz, fumed silica, and mixtures thereof.

14. A compound according to claim 9, wherein said colors are food-compatible colors.

15. A silicone compound according to claim 1, wherein the working and setting times remain substantially unchanged even after exposure to 65° C. for a period of at least 25 days.

16. A silicone compound according to claim 3, wherein said crosslinking agent is a polyhydrogen organosiloxane.

* * * * *